UNITED STATES PATENT OFFICE.

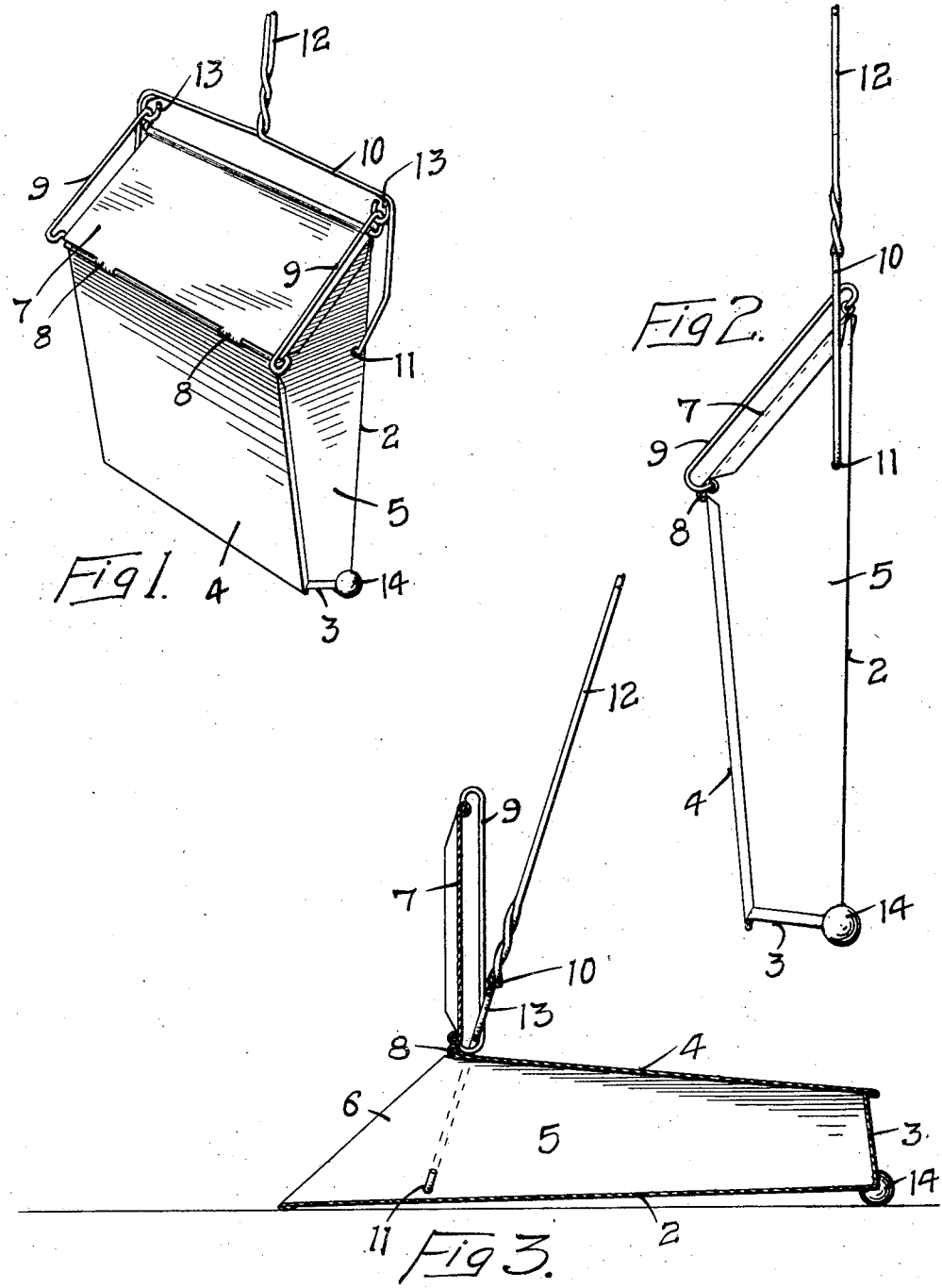

FREDERICK M. FOLSOM AND ELMER E. HIGGINS, OF MINNEAPOLIS, MINNESOTA; SAID HIGGINS ASSIGNOR TO SAID FOLSOM.

DUST-PAN.

978,724.  Specification of Letters Patent.  Patented Dec. 13, 1910.

Application filed March 10, 1910. Serial No. 548,497.

*To all whom it may concern:*

Be it known that we, FREDERICK M. FOLSOM and ELMER E. HIGGINS, of Minneapolis, Hennepin county, Minnesota, have invented certain new and useful Improvements in Dust-Pans, of which the following is a specification.

The object of our invention is to improve the construction of a covered dust pan to the end that the handle portion will be locked and cannot be swung backwardly past a predetermined angle with respect to the pan. Devices of this kind with hinged covers have been heretofore used but they have been found to be objectionable, owing to the fact that there is no locking means in connection with the handle and it is frequently bent back so far as to either break it or render the device unsuitable for further use.

Our invention consists generally in a dust pan having a hinged cover and a pivoted bail provided with an operating handle, said bail having a sliding connection with the cover and coöperating therewith, but locking the handle in a predetermined position.

In the accompanying drawings forming part of this specification, Figure 1 is a perspective view of a dust pan embodying our invention, Fig. 2 is a side view of the same, Fig. 3 is a sectional view showing the cover in its open position.

In the drawing, 2 represents the bottom of the pan, having a rear wall 3, a top 4, side walls 5 and an intake opening 6 at its forward end. The bottom and side walls of the pan project beyond the top, as shown in Fig. 3, to adapt the device for gathering up dust and dirt on the floor or carpet. A cover 7 is pivoted at 8 and adapted to close the opening 6, and said cover is provided at each end with yielding rails 9 which extend transversely of the cover from its forward to its rear edge and is suitably secured thereto. These rails are preferably formed of a suitable gage of wire and may extend lengthwise of the cover to form the pivot of the hinge at one edge and to strengthen the forward edge. This, however, is a detail of construction to which we do not wish to be confined.

10 is a bail having inwardly turned ends pivoted at 11 in the side walls of the pan and carried out around the end of the pan and inwardly to form a centrally arranged handle 12. At each corner of the bail loops 13 are formed in the wire of which the bail is preferably composed, said loops being adapted to slide on the rails 9 and thereby open or close the cover when the bail and cover are rocked. These loops are of such size and are so located as not to bind the rails 9 when the handle is swung forward toward the hinges 8. In opening the cover, the bail will swing to the position indicated in Fig. 3 and the loops will slide down on the rods 9 to points near the hinge 8 and any further backward movement of the bail and handle will be resisted by the hinge 8 and consequently when the handle is thrown to the position shown in Fig. 3 and the device is in use, it will be impossible to swing the bail and handle backwardly and bend them out of their proper working position. When the pan is lifted to the position indicated in Fig. 2, the movement of the bail will automatically close the cover of the pan and prevent the escape of dirt and dust therefrom.

At the rear corners of the pan we prefer to provide yielding blocks or balls 14 of suitable material, such as rubber, to protect the furniture against which the pan may be pushed, and also to tilt the nose of the pan to an operative position.

We claim as our invention:—

1. A dust pan having a pivoted cover, rails 9 mounted thereon and extending transversely of the cover at each end thereof, a bail pivoted on said pan and provided with an operating handle and adapted to swing back and forth over said cover, said bail including parts extending transversely of the pan and terminating in inwardly turned ends pivotally connected with the pan, loops formed on said bail in the angle between said transverse and inwardly turned parts, said loops sliding on said rails and assuming a position near the pivot of said cover when said cover is in its open position, whereby said handle will be locked and limited in its backward movement.

2. A dust pan having a pivoted cover, rails extending transversely of said cover at the ends thereof and along its longitudinal edges and forming a pivot pin for said cover on one edge and a strengthening rail on the other edge, a bail pivoted on said pan and having an operating handle and loops formed on said bail and slidable on said end rails, said loops assuming a position near the pivot of said cover when the cover is raised and limiting thereby the backward movement of said handle.

In witness whereof, we have hereunto set our hands this 5, day of March 1910.

FREDERICK M. FOLSOM.
ELMER E. HIGGINS.

Witnesses:
J. A. BYRNES,
L. C. CRONIN.